United States Patent [19]
Roberts

[11] Patent Number: 6,144,966
[45] Date of Patent: Nov. 7, 2000

[54] TRANSFORMATION SYSTEM AND METHOD FOR TRANSFORMING TARGET DATA

[75] Inventor: Michael G. Roberts, Waikoloa, Hi.

[73] Assignee: Canon Kabushiki Kaisha, Tokyo, Japan

[21] Appl. No.: 09/074,018

[22] Filed: May 6, 1998

[51] Int. Cl.[7] .................................................. G06F 17/30
[52] U.S. Cl. ......................................... 707/101; 707/100
[58] Field of Search ..................................... 707/100, 101

[56] References Cited

U.S. PATENT DOCUMENTS

| | | | |
|---|---|---|---|
| 5,315,709 | 5/1994 | Alston, Jr. et al. | 707/6 |
| 5,890,154 | 3/1999 | Hsiao et al. | 707/8 |
| 5,946,688 | 8/1999 | Roberts | 707/10 |
| 5,960,435 | 1/2000 | Rathmann et al. | 707/101 |
| 6,014,670 | 1/2000 | Zamanian et al. | 707/101 |

OTHER PUBLICATIONS

Setzer, Program Development by Transformations Applied to Relational Database Queries, Very Large Data Bases Fith International Conference IEEE, pp. 436–443, Oct. 1979.

Kajiyama et al., TRICS: Transformation System of Relations into Conceptual Structure, IEEE. pp. 1390–1395, Oct. 1997.

*Primary Examiner*—John Breene
*Assistant Examiner*—Greta Robinson
*Attorney, Agent, or Firm*—Paul Hentzel

[57] ABSTRACT

Transformation system 10A transforms target data from data base 11B into target' data by the execution of transform functions on the target data. Transform register 13 stores transformation UIDs (target UIDs and function UIDs and target' UIDs) for providing UID transformation instructions to effect the transformation of target data into target' data. The transform register has target column of rows 13T which store target UIDs identifying target data to be transformed. The transform register also has function column of rows 13F which store function UIDs. The function UID identifies a transform function for execution on the target data identified by the target UID stored in the target column along the same row as the function UID. The transform register also has a target' column of rows 13T' which store target' UIDs. The target' UID identifies target' data transformed from the target data by the execution of the transform function identified by UIDs stored along the same row as the target' UID. The target' data may then be stored in data base 11B and retrieved as required. Transform function roster 11R holds the transform functions (O, P, T . . . ), and is responsive to UID dispatcher 11D and the function UIDs stored in the function column of the transform register for providing the transform function identified thereby. Function execution unit 11U is responsive to the transform functions held in the transform function roster and to the target data identified by the target UIDs, for executing the transform functions on the target data to provide the target' data.

30 Claims, 4 Drawing Sheets

6,144,966

TRANSFORMATION SYSTEM AND METHOD FOR TRANSFORMING TARGET DATA

TECHNICAL FIELD

This invention relates to transformation systems for transforming target data, and more particularly to such transformation systems having a transform register which stores UIDs identifying target data, and UIDs identifying transform functions employed in the transformation, and UIDs identifying the resulting target' data.

BACKGROUND

U.S. Pat. No. 5,946,688 issued on Aug. 31, 1999 to the present inventor discloses a system of data storage tables including an extendable subject table, and an extendable element table. The subject table stores subject UID entries which identify subject data. The element table stores UID element entries and aggregate UID entries and role UID entries. The UIDs stored in these tables specify relationships between the UIDs, and between subject data, roles, elements and aggregations identified by the UIDs. The stored UIDs collectively define a tangle of connecting paths. The tangle spreads out between subject nodes corresponding to subject UIDs, and aggregation nodes corresponding to aggregate UIDs, and role nodes corresponding to role UIDs. Each subject node and aggregation node and role node is path connected through the tangle to other subject nodes and aggregation nodes and role nodes defining the relationships between the UIDs in the tables.

SUMMARY

It is therefore an object of this invention to provide a transformation system and method for transforming target data into target' data by the execution of transform functions on the target data.

It is another object of this invention to provide such transformations which involve UID transformation instructions.

It is another object of this invention to provide such transformations which involve multiple transformations in series and/or in parallel.

It is another object of this invention to provide such transformations which involve anchor transformations.

It is another object of this invention to provide such transformations within a tangle of connecting paths.

Briefly, these and other objects of the present invention are accomplished by providing a transformation system for transforming target data into target' data by the execution of transform functions on the target data. A transform register stores UIDs for providing transformation instructions to effect the transformations. The transform register has a target column of rows at least some rows of which store target UIDs identifying target data to be transformed. The transform register also has a function column of rows, at least some rows of which store function UIDs identifying transform functions. Each transform function for execution on the target datum is identified by the target UID stored in the target column along the same row therewith. The transform register also has a target' column of rows, at least some rows of which store target' UIDs. Each target' UID identifies a target' datum transformed from a target datum by the execution of the transform function. The transform function is identified by the function UID stored in the function column along the same row as the target UID, and is executed on the target datum identified by that target UID. Each row of the transform register which stores a target UID in the target column thereof and a function UID in the function column thereof and a target' UID in the target' column thereof, provides a transformation instruction for transforming a target datum into a target' datum by the execution of a transform function.

BRIEF DESCRIPTION OF THE DRAWING

Further objects and advantages of the present transformation system and method, and the operation of the transform register will become apparent from the following detailed description and drawing in which.

Figures 1A, 1B:
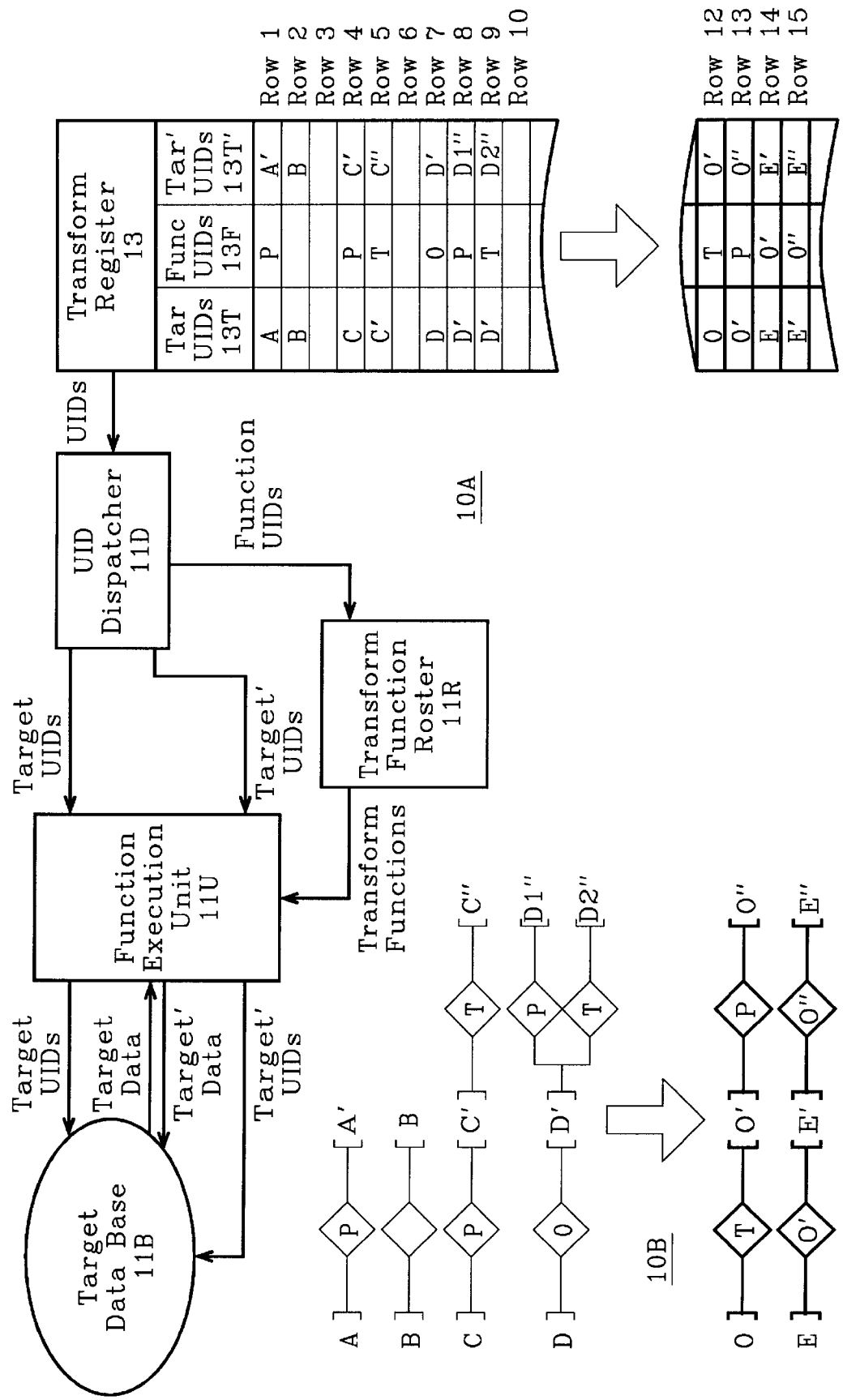
FIG. 1A is a block diagram of transformation system 10A which transforms target data retrieved from data base 11B into target' data through the execution of transform functions from transform function roster 11R in response to transformation instruction from transform register 13.
FIG. 1B is transformation chart 10B illustrating the transformation instructions stored in transform register 13 of FIG. 1A.

The elements of the invention are designated by two digit reference numerals in the above figures. The first digit indicates the figure in which that element is first disclosed or is primarily described. The second digit indicates like features and constructions throughout the figures. Some reference numerals are followed by a letter which indicates a sub-portion or related feature of that element.

The table below lists the reference numerals employed in the figures, and identifies the element designated by each numeral.

| | |
|---|---|
| 10A | Transformation System 10A |
| 10B | Transformation Chart 10B |
| 11D | UID Dispatcher 11D |
| 11B | Data Base 11B |
| 11R | Transform Function Roster 11R |
| 11U | Function Execution Unit 11U |
| 13 | Transform Register 13 |
| 13F | Function Column 13F |
| 13T | Target Column 13T |
| 13T' | Target' Column 13T' |
| 20A | Storage Table System 20A |
| 20B | Tangle of Connecting Paths 20B |
| 22 | Subject Table 22 |
| 22D | Subject Data Column 22D |
| 22S | Subject UID Column 22S |
| 23 | Transform Register 23 |
| 23F | Function Column 23F |
| 23T | Target Column 23T |
| 23T' | Target' Column 23T' |
| 26 | Element Table 26 |

| | -continued | |
|---|---|---|
| 26A | Aggregate Column 26A | |
| 26E | Element Column 26E | |
| 26R | Role Column 26R | |

GLOSSARY OF TERMS

The following terms are used in the claims to specify this invention. Each term is defined briefly below in the order of appearance in the claims.

Transform Function—is an operator contained within a transformation instruction defining a transformation of target data into target' data (see Transform Function section).

Transform Register—a memory allotment for storing UIDs and their relationships with each other (if any) in register format. The allotment may be located in one region of the memory with sequential addresses for convenient assembly of the register, or distributed throughout the memory.

Register Column—a portion of the register memory allotment in column format within the register containing target UIDs or target' UIDs or transform function UIDs for grouping UIDs within the UID relationships.

Transformation Instruction—one or more lines of the transform register each line containing a target UID, a function UID and a target' UID defining a transformation.

Anchor—a relationship between target data and target' data which is defined by an anchor transform function (see FIGS. 3A–3E).

Table—similar to register above.

Table Column—similar to register column above.

Tangle—a visual representation of the UID relationships specified by the tables showing subject nodes corresponding to subject UIDs, and aggregation nodes corresponding to aggregate UIDs, and role nodes corresponding to role UIDs, and transform stations corresponding to transformation instructions.

Subject—a datum or data cluster which is defined as a unit within a data base. Each subject is identified within the tables by a unique subject UID, and represented in the tangle by a corresponding subject node.

Aggregation—a collection of individually addressable elements. Each aggregation is identified within the tables by a unique aggregate UID, and represented in the tangle by a corresponding aggregation node.

Element Aggregate Fold-Back—A connection within the element table, between an aggregate fold-back UID in the aggregate column and an element in the element column, in a different row as the aggregate fold-back UID.

Target Aggregate Fold-Back—A connection between an aggregate fold-back UID in the aggregate column of the element table and a target UID in the target column of the transform register.

Element Connection—A connection within the element table, between an element in the element column and an aggregate UID in the aggregate column, along the same row as that element.

Role—creates a relationship between an aggregation and an underlying element connection. Each role is identified within the tables by a unique role UID, and represented in the tangle by a corresponding role node.

Element Role Fold-Back—A connection within the element table, between an element connection along the same row as a role UID in the row column, and a fold-back UID in the element column of a different row.

Target Role Fold-Back—A connection between an element connection along the same row as a role UID in the row column, and a transform fold-back UID in the target column of the transform register.

Nascent Location—a vacant place keeping location in the function column of the transform register (or in the role column of the element table), which may later contain a transform function UID (or a role fold-back UID).

Identical UID—refers to the multiple appearance of the same UID at various locations in the tables.

GENERAL EMBODIMENT

FIGS. 1A and 1B

Transformation system 10A (shown in the block diagram of FIG. 1A) transforms target data from data base 11B into target' data by the execution of transform functions on the target data. Transform register 13 stores transformation UIDs (target UIDs and function UIDs and target' UIDs) for providing UID transformation instructions to effect the transformation of target data into target' data. The transform register has target column of rows 13T at least some rows of which store target UIDs identifying target data to be transformed. The transform register also has function column of rows 13F at least some rows of which store function UIDs. The function UID identifies a transform function for execution on the target data identified by the target UID stored in the target column along the same row as the function UID. The transform register also has a target' column of rows 13T' at least some rows of which store target' UIDs. The target' UID identifies target' data transformed from the target data by the execution of the transform function identified by UIDs stored along the same row as the target' UID. Each row of the transform register which stores a complete complement of transformation UIDs (a target UID and a function UID and a target' UID) provides a complete UID transformation instruction. Each instruction instructs the transformation system to transform the identified target data into the identified target' data by the execution of the identified transform function. The above transformation UIDs are unique identifiers for each entry in the transform register, and are typically a binary number similar to a memory address.

The transformations specified by the one-row UID transformation instructions in transform register 13 are depicted in transformation chart 10B as a compilation of transformations. Each target UID is represented by a beginning alphabet character (A, B, C . . . ) in transform register 13 of FIG. 1A and in transformation chart 10B of FIG. 1B. Each transform function is represented by a middle alphabet character (O, P, T, . . . ). Each transform character is enclosed within a diamond symbol in the transformation chart, indicating a transform station. The resulting target' UID is represented by the same beginning character as the target data with a prime symbol (A', B', C' . . . ) indicating that the target data has been transformed into target' data of that same character. The target' data may then be stored in data base 11B and retrieved as required. The columns of the transform register may be extended indefinitely without constraint by adding more rows of target UIDs to the target column and more rows of function UIDs to the function column and more rows of target' UIDs to the target' column. The transformation UIDs in the added rows provide additional transformation instructions. Transform register 13 may be extended indefinitely by such additions as indicated by the downward arrow under the register. Transform function roster 11R holds the transform functions (O, P, T . . . ), and is responsive to UID dispatcher 11D and the function UIDs stored in the function column of the transform register for providing the transform function identified thereby. Function execution unit 11U is responsive to the transform functions held in the transform function roster and to the target data identified by the target UIDs, for executing the transform functions on the target data to provide the target' data. The function execution unit may be any suitable executing device such as computer software operating within a CPU or logical hardware circuitry. UID Dispatcher 11D directs target UIDs and target' UIDs from transform register 13 to function execution unit 11U. The dispatcher also directs function UIDs to transform function roster 11R.

Transform Function

A transform function may be any suitable operator such as a simple multiplier or divisor, or a complex mathematical relationship. The transform function may be classification or logic based rather than numerical, or may be instructions that would be understood by an external entity such as a processor or human operator. For targets which have identifiable elements, the transform function may be an external function that treats each element of the target data the same as the other elements. In this manner, the elements of the target may either be treated collectively as a single monolithic whole indivisible object, or each element is identically treated as an individual target. The latter interpretation provides an efficient means for the specification of functional relations involving large numbers of targets, compactly represented by a function of a complex target that has them as elements. Alternatively, the transform function may be an internal function which enters the target data and treats the elements individually. In this manner, some or all of the elements of the target may be treated as the separate arguments of a traditional function invocation. Within this interpretation, groups of elements may be treated as either whole single objects, or as collections of individual targets, as explained above.

Transformation Examples Rows 1–9

Row 1 of transform register 13 stores the transformation instruction (A|P|A') which is illustrated in the first line of transformation chart 10B. Target data A identified by target UID A is transformed by transform function P identified by function UID P to provide target' data A' identified by target' UID A'.

Row 2 of transform register 13 contains the entry (B| |B) which is illustrated in the second line of transformation of chart 10B. The function location in row 2 of function column 13F is vacant. This location does not contain a transform function. Row 2 does not contain a complete instruction, and therefore has no present effect on the transformation of target data B identified by target UID B as indicated in the transformation chart. Such vacant locations in transform register 13 are nascent locations, and merely save a place in the function column for a future function UID (or target UID or target' UID). Each vacant nascent location in the transform function column, identifies a corresponding nascent transform function indicated by an empty diamond in FIG. 1B.

Figures 2A, 2B:
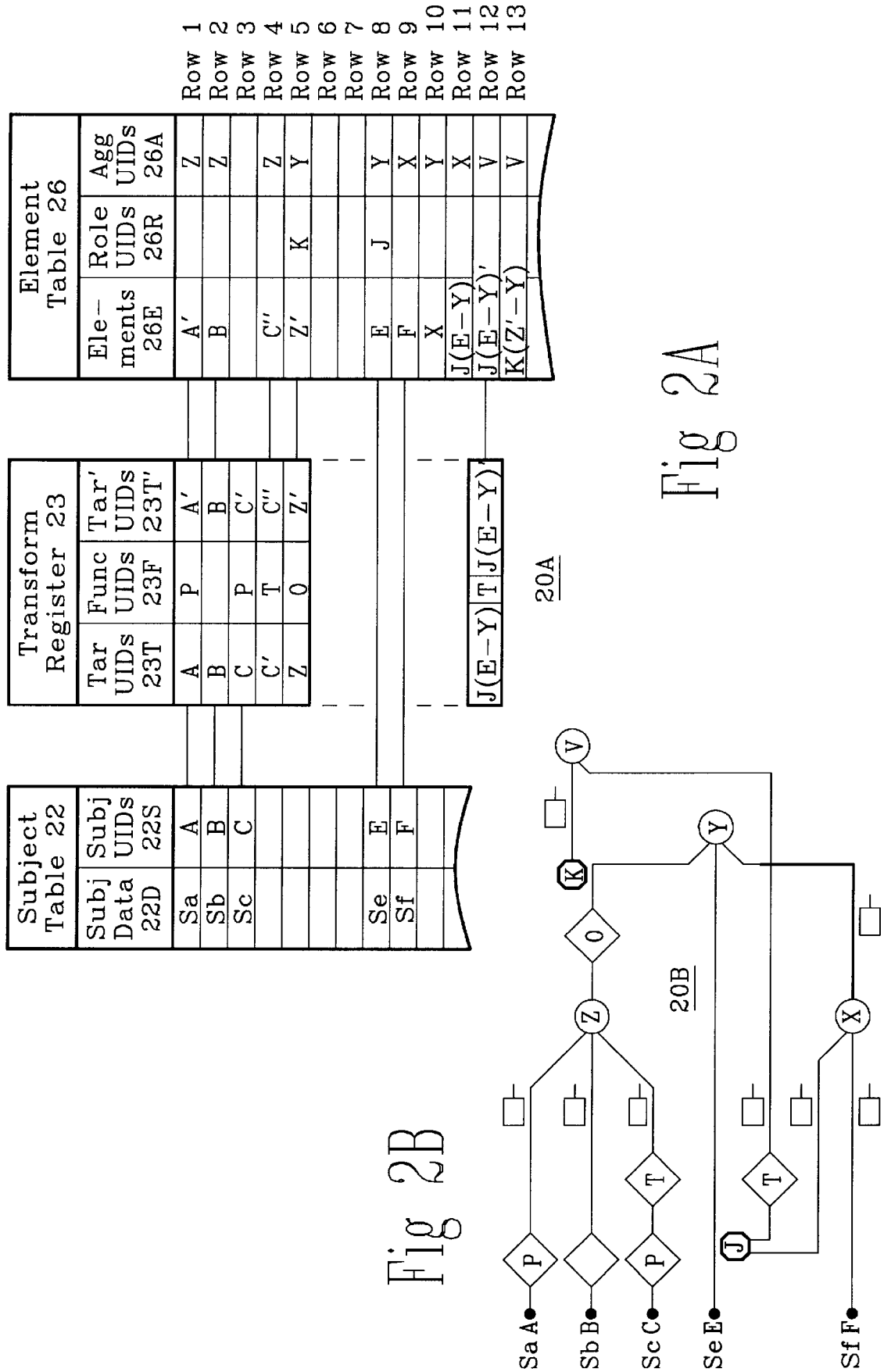
FIG. 2A is a block diagram of tangle transformation system 20A which is an expansion of system 10A of FIG. 1A, showing subject table 22 and element table 26 interfacing with transform register 23.
FIG. 2B is a node-station diagram illustrating the transformation instructions and tangle of connecting paths 20B defined by tangle transformation system 20A of FIG. 2A.

Row 3 of transform register 13 is completely empty. The rows of the transform register do not have to be completely filled in order from top to bottom. A row may be left empty at random or by design for future use in the registers and tables of both FIG. 1A or FIG. 2A. An empty row may be created by the cancellation of a transformation instruction which is no longer in use. In addition, FIG. 2A shows the related UIDs of table 22 and register 23 and table 26 very conveniently entered along the same row. Row 1 for example has data Sa and UID A on the same row with the related transformation of UID A into UID A' and the related aggregation of UID A' into aggregation Z. This intertable alignment by row is for illustration, and is not a requirement.

Rows 4 and 5 of transform register 13 contain a double transformation instruction (C|P|C'|T|C") which is illustrated in the third line of transformation of chart 10B. Target data C is transformed by transform function P to provide target' data C', which is transformed by transform function T to provide target' data C". The double transformation is accomplished by returning target' UID C' at the end of the row 4, to the target column at the beginning or row 5 for a second transformation by transform function T. Target data C represented by target UID C under goes two transformations in series. Multiple transformations may be effected by combining multiple rows in the transform register.

Rows 7, 8, and 9 of transform register 13 contain parallel transformation instructions which are illustrated in the fourth line of transformation chart 10B. Target data D is transformed by transform function O into target' data D' in row 7. Target UID D' is then returned to the target column at row 8 and row 9 for two parallel transformations of target' data D' by transform function P and transform function T.

Transforming Transform Functions Rows 12–15

A first generation transform function may be transformed into a second generation transform function by the execution thereon of another transform function. Row 12 of transform register 13 (the lower section in bold) shows a first generation transform function O transformed into a second generation transform function O' by the execution of the transform function T. Rows 12 and 13 of transform register 13 contain a double transformation instruction (O|T|O'|P|O") which is illustrated in the fifth line of transformation of chart 10B. This double execution transforms the target data O (which is transform function O in row 14) into target" data O" (which is transform function O" in row 15) by the serial execution of transform function T and transform function P. Rows 14 and 15 of transform register 13 contain another double transformation instruction (E|O'|E'|O"|E") which is illustrated in the last line of transformation of chart 10B. This last double execution transforms target data E into target' data E" by the serial execution of transform function O' and transform function O" provided by the previous double execution.

ELEMENT TABLE EMBODIMENT

FIGS. 2A and 2B

Tangle transformation system 20A (shown in the block diagram of FIG. 2A) includes subject table 22 and element table 26 interfacing with transform register 23. Transform register 23 is similar in function and operation to transform register 13 (see FIG. 1A), and employs a dispatcher, a function roster, and an execution unit which have been omitted from FIG. 2A for convenience. The structure and operation of subject table 22 and the element table are disclosed in detail in U.S. Pat. No. 5,946,688 issued on Aug. 31, 1999 to the present inventor, the subject matter of which is hereby incorporated by reference in its entirety into this disclosure. Subject table 22 stores subject UID entries, and element table 26 stores UID element entries, aggregate UID entries, and role UID entries. The UIDs stored in subject table 22 and transform register 23 and element table 26 specify relationships between the data identified by the UIDs. The stored UIDs collectively define a tangle of connecting paths 20B (shown in the node-station diagram FIG. 2B) which depict these relationships. The tangle connects:

subject nodes (black dots) which correspond to subject UIDs, and transform stations (diamonds with letters) which correspond to function UIDs, nascent stations (diamonds without letters) which correspond to vacant locations in function column 23F of transform register 23 aggregation nodes (circles with letters) which correspond to aggregate UIDs, role nodes (octagons with letters) which correspond to role UIDs, and nascent role nodes (rectangle without letters) which correspond to vacant locations in role column 26R of element table 26.

The tangle is a visual aid which provides a visual depiction of the relationships (if any) between each node or station and other nodes or stations in the tangle.

Subject Table

Subject table 22 has subject column 22S of rows, at least some rows of which store subject UIDs. Certain rows of subject column 22S may store a subject UID which is identical to a target UID stored in the target column of the transform register. The subject data identified by that subject UID is transformed into target' data identified by the target' UID stored in the target' column along the same row as that target UID. The transformation is accomplished by execution of the transform function identified by the function UID along the same row as the target UID. The subject table may also be extended indefinitely to include more rows and storing subject UIDs. Each subject UID is represented in the FIG. 2A tables by a beginning alphabet character (A, B, C . . . ) the same as the target UIDs. Each subject UID defines a corresponding subject node (black dot) within the tangle of connecting node paths, represented by the same alphabet character (A, B, C . . . ) in FIG. 2B. Each subject node is path connected through the tangle to other subject nodes corresponding to other subject UIDs stored in the subject table.

Element Table

Element table 26 has element column of rows 26E, at least some rows of which store UID elements. The element table also has an aggregate column of rows 26A, at least some rows of which store aggregate UIDs, and role column of rows 26R at least some rows of which store role UIDs. Each UID element stored in element column 26E is either a subject UID based on an identical subject UID in subject column 22S, or a target' UID based on an identical target' UID in target' column 23T', or an aggregate UID folded-back from aggregate column 26A, or a role UID folded-back from role column 26R.

The UID elements have corresponding node elements distributed across FIG. 2B which are either subject nodes, aggregation nodes, role nodes, or transform stations. The element table also may be extended indefinitely.

Each aggregate UID is represented in the FIG. 2A tables by an ending alphabet character ( . . . X, Y, Z). Each aggregate UID defines a corresponding aggregation node within the tangle of connecting node paths, represented in FIG. 2B by a circle containing the same alphabet character ( . . . X, Y, Z). The aggregate UIDs define aggregations of elements formed by subject UIDs, role UIDs, and other aggregate UIDS. Each aggregate UID forms an element connection with an UID element stored in the element column along the same row therewith. The three element connections of rows 1, 2, and 4 of element table 26 are:

UID Element A' to Aggregate UID Z,

UID Element B to Aggregate UID Z,

UID Element C'' to Aggregate UID Z.

Identical aggregate UIDs in the aggregate column (such as Z) determine an aggregation of UID elements through the element connections with the UID elements.

Some rows of role column 26R store a role UID defining a role node. The role UIDs provide a role connection between the element connection along the same row as a role UID in the row column, and a fold-back role UID in the element column of a different row. Each role UID is represented in the FIG. 2A tables by a middle alphabet character ( . . . J, K, . . . ), and defines a corresponding role node represented in FIG. 2B by an octagon containing the same middle alphabet character ( . . . J, K, . . . ). The row 5 of element table 26 contains an example of a role connection, role UID K to the element connection formed by UID Element Z' and Aggregate UID Y.

Other rows of role column 26R store a nascent vacant location defining a nascent role node. The nascent vacant location has no present effect on the UID relationships or the tangle of connecting paths. These vacant locations merely save a place in the role column for a future role UID. Each nascent vacant location identifies a corresponding nascent role node represented by an empty rectangle in FIG. 2B.

Fold-Back Aggregation Connections

The UID elements stored in the rows of the element column of table 26 include fold-back aggregate UIDs which are aggregate UIDs folded-back from a row in the aggregate column into a different row of the element column, creating a connection from one aggregate UID to another aggregate UID. Rows 9 and 10 of element table 26 contain an example of a fold-back aggregation connection. Aggregation UID X in the aggregate column of row 9, is folded-back to the element column of row 10 to form an aggregation to aggregation connection with Aggregate UID Y in the aggregate column of row 10. Each fold-back aggregate UID creates another row in the element table, and produces a corresponding aggregation node to aggregation node connecting path in the tangle. Each of these aggregate fold-back paths create an aggregation within an aggregation relationship. The aggregation of UID elements belonging to each aggregate UID folded-back into the element column, form a single composite element belonging to the aggregation of the aggregate UID stored in the aggregate column along the same row as that fold-back aggregate UID.

Aggregate UIDs may be folded-back to the target column in the transform register for providing a transformed aggregation. Target UIDs stored in the rows of target column 23T of transform register 23 may include fold-back aggregate UIDs which are aggregate UIDs folded-back from a row in aggregate column 26A of element table 26 into a different row of the target column. The aggregation identified by the aggregate UID, is transformed by the transform function along the same row of the transform register as the fold-back aggregate UID. Row 4 and 5 of element table 26 contain an example of an aggregate UID folded-back to transform register 23. Aggregate UID Z in row 4 of aggregate column 26A, is folded-back to row 5 of target column 23T, for transformation into UID Z' by transform function O in row 5 of function column 23F. UID Z' then appears in row 5 of element column 26E of element table 26 to form an aggregation to aggregation connection with Aggregate UID Y in row 5 of aggregate column 26A. Aggregate UID Z in rows 1 and 2 of element table 26 is the same UID Z of row 5, and therefore is also folded-back to row 5 of target column 23T.

Fold-Back Role Connections

The UID elements stored in the rows of the element column of table 26 include fold-back role UIDs which are role UIDs folded-back from a row in the role column into a different row of the element column creating a fold-back role connection. A fold-back role connection involves four UIDs:

1) a role UID in the role column,
2) the element connection between the UID element and the aggregate UID along the same row as the role UID, and
3) an identical fold-back role UID in the element column of a different row.

Rows 8 and 11 of element table 26 contain an example of a fold-back role connection. Role UID J in the role column of row 8, is folded-back to the element column of row 11 to form a role connection between element connection E-Y in row 8 and Aggregate UID X in the aggregate column of row 11. Each fold-back role UID creates another row in the element table, and produces a corresponding role node in the tangle, along with a corresponding role fold-back path which connects the role node to other nodes within the tangle. The role UID connection provided by each role UID in the role column and identical fold-back role UID in another row of the element column creates a role relationship. This created role relationship is between an aggregate UID in the aggregate column and the existing underlying element relationship between an UID element and an aggregate UID. Folding back creates higher level relationships between relationships such as aggregations of aggregations and aggregations of roles. Many iterations of folding back into the element column results in an enormously complex tangle having a meta-structure of relationships which may "go fractal" as disclosed in the above cited U.S. Pat. No. 5,946,688 Aug. 31, 1999.

Role UIDs may be folded-back to the target column in the transform register for providing a transformed role connection. Target UIDs stored in the rows of target column 23T of transform register 23 may include fold-back role UIDs which are role UIDs folded-back from a row in row column 26R of element table 26 into a different row of the target column. The role connection identified by the role UID, is transformed by the transform function along the same row of the transform register as the fold-back role UID. Rows 8 and 12 of element table 26 contain an example of a role UID folded-back to transform register 23. Role UID J in element connection E-Y in row 8 of aggregate column 26A, is folded-back to row 12 of target column 23T as UID J(E-Y). The folded-back UID J(E-Y) is transformed into UID J(E-Y)' by the transform function T in row 12 of function column 23F. UID J(E-Y)' then appears in row 12 of element column 26E of element table 26 to form an aggregation to aggregation connection with Aggregate UID V in row 12 of aggregate column 26A.

Aggregations of Elements

Each UID element stored in the element column is an element belonging to the aggregation of a particular aggregation node. The UID element may be either a subject UID, a target' UID, an aggregate UID, or a role UID, and the aggregations may be formed by any combination of the above elements. In FIG. 2A, the three appearances of aggregate node Z in aggregate column 26A specify the three element aggregation A', B, and C" from UID A', UID B and UID C" stored in element column 26E along the same rows with the three Z aggregate UIDs. This {A',B,C"}=Z aggregation is shown in FIG. 2B by three subject paths merging at node Z.

The aggregation node Y also appears three times in aggregate column 26A specifying a Y aggregation of elements which includes the entire transformed Z' aggregation, and subject element E, and aggregation X. That is Y aggregation={Z',E,X}. Other aggregation relationships specified by the FIG. 2A tables and shown in the FIG. 2B tangle 20B are:

J(E-Y)+F=X aggregation, and
J(E-Y)'+K(Z-Y)=V aggregation.

Aggregate UIDs V and X each appear only twice in aggregation node column 26A. Therefore aggregations V and X each have only two elements.

Roberts Machine

The UID table system 20A of FIG. 2A and related path tangle 20B of FIG. 2B illustrate the principles of a Roberts machine which is a specialized type of Turing machine. The concept of a Turing machine developed in the early 1950s by Allen Turing involves a process plus memory for computing anything which is computable. Alan Turing was the seminal computer theorist and code breaker of the mid-twentieth century. A general Roberts machine is an example of a Turing machine, and like a Turing machine, provides a process for changing data and creating new data, plus memory for providing the data on which the change is based. A Roberts machine is a Turing machine which is optimized for the representation and manipulation of arbitrary structures of information. The Roberts machine is optimized for creating and processing arbitrary information structures which relate anything to anything in any way.

GENERAL ANCHOR APPLICATION

FIGS. 3A–3E

One application of the transform function aspect of the Roberts machine storage table system is to provide an anchor relationship between data. The transform function may be an anchor transform function for defining an anchor relationship (or pattern of association) between the target data and the target' data. Anchor functions establish generic associations which identify the data to be affected, and are typically followed by mathematical (or other) transform functions which process the anchored elements of the data. FIGS. 3A–3E are Venn diagrams showing some classes of the various anchor relationships possible between the target data and the target' data effected by the anchor transformations.

Figure 3A:
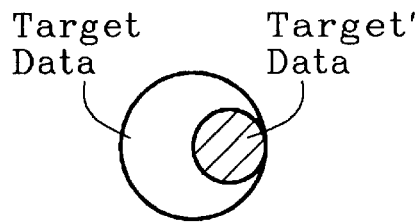
FIGS. 3A–E are Venn diagrams showing various anchor relationships between the target data and the target' data effected by various anchor transformations.

The anchor transform function may be a subset function defining the target' data as a subset of the target data, as indicated by hatched lines in FIG. 3A. In this subset case the transform function anchors the target' data to a portion of the target data which is less then the entire target data. For example, a page target' data may be anchored to a document target data. An internal attribute such as a word target' data (or a date or a name or a paragraph) may be anchored to a page target data.

Figure 3B:
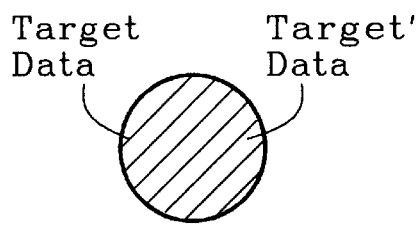

The anchor transform function may be unity function defining the target' data as the whole of the target data as indicated by hatched lines in FIG. 3B. In this unity (or degenerate) case the transform function anchors the target' data to the entire target data. For example, a page as target' data may be anchored to the same page as target data, or a document as target' data may be anchored to the same document as target data.

Figure 3C:
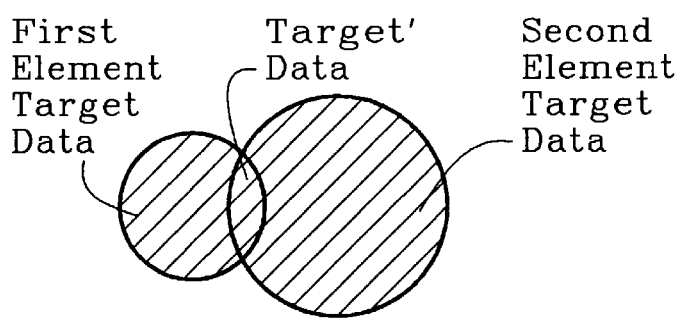

The anchor transform function may be a union function defining the target' data as a union of first element target data and second element target data as indicated by hatched lines in FIG. 3C. In this union case, the target' data is anchored to a data unit which is less than or equal to the target data by virtue of reduction of repeated elements to single elements.

Figure 3D:
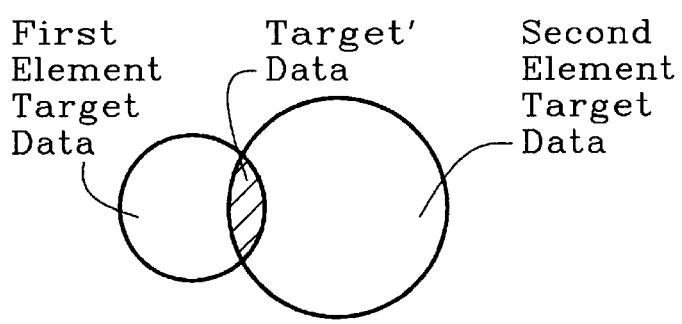

The anchor transform function may be an intersection function defining the target' data as the intersection between a first element target data and a second element target data as indicated by hatched lines in FIG. 3D. In the intersection case, the target' data is the intersection portion common to both the first element target data and the second element target data.

Figure 3E:
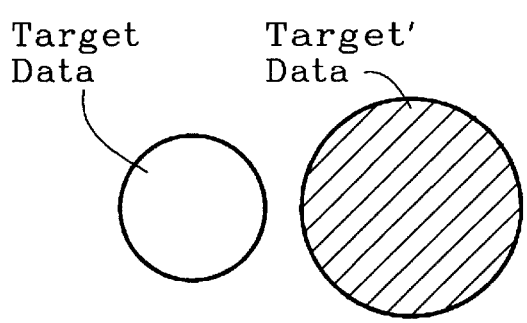

The anchor transform function may be the disjoint function defining the target' data as disjointed from a target data and thus is not the target data or any element thereof, as indicated by hatched lines in FIG. 3E. In the disjointed (or referential) case target' data is completely separate from the target data.

SUBJECT DATA
FIGS. 2A and 2B

Subject table 22 (shown in FIG. 2A) may have a subject data column 22D of rows adjacent to subject column 22S of rows. Subject datum (Sa, Sb, ... Sf ... ) stored in each row is identified by the subject UID stored along the same row therewith. Each subject datum may have a memory interface connection to a system data base which by indirection permits the subject UIDs to identify system data for retrieval and processing.

METHOD OF TRANSFORMATION
FIG. 4

Figure 4:
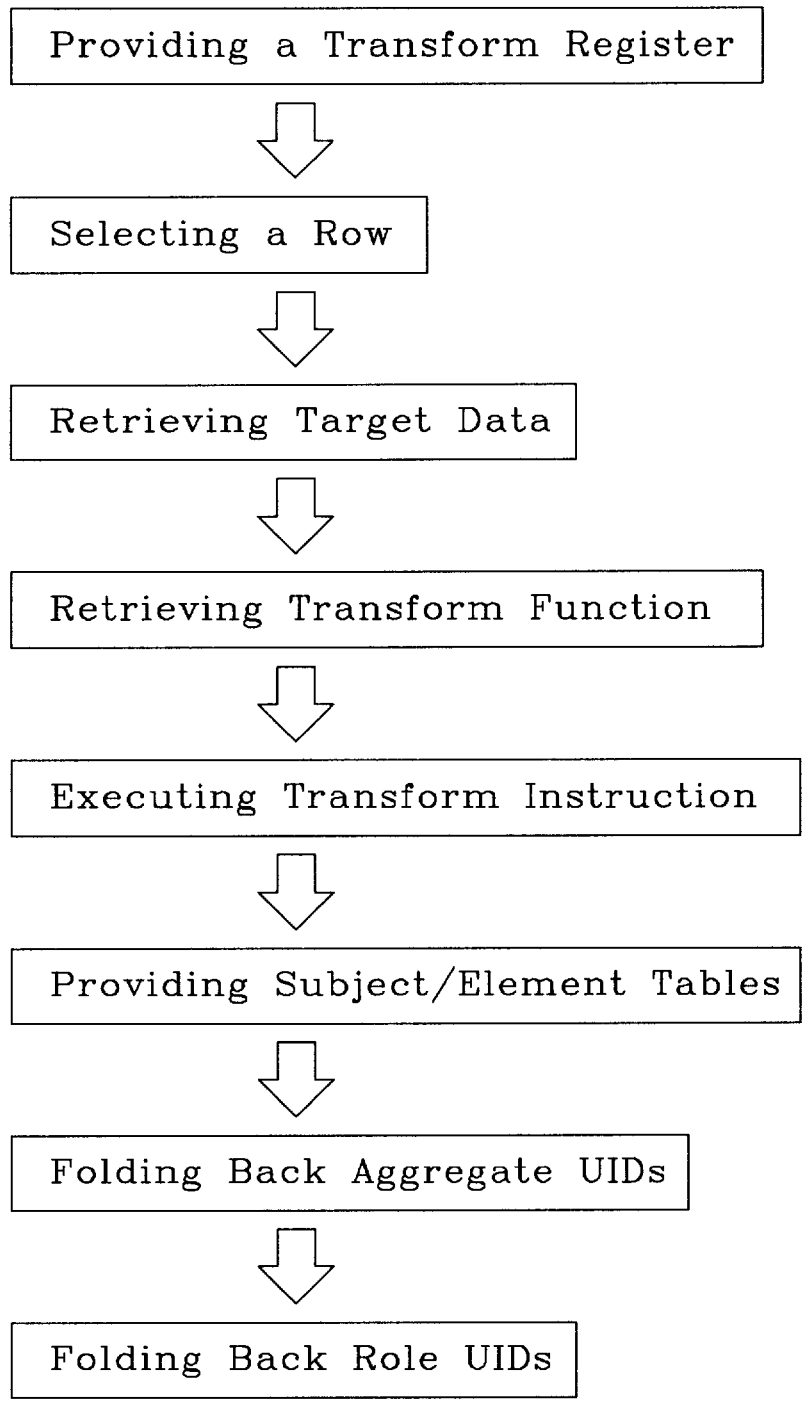
FIG. 4 is a flow chart showing the steps in the general method of transforming target data.

A method of transforming target data into target' data through a transform function executed on the target data, in an expandable tangle of connecting node paths and transform stations is shown in the flow chart of FIG. 4. The tangle of the method spreads out between subject nodes and transform stations and aggregation nodes and role nodes defined by subject UIDs and function UIDs and aggregate UIDs and role UIDs stored in the extendable storage system. The basic steps and sub-steps of the method are presented below.

Providing a transform register having a target column of rows for storing a target UID identifying target data to be transformed contained in a target data base. The transform register also has a function column of rows, for storing a function UID identifying a transform function held in a transform function roster to be applied to the target data identified by the target UID stored in the target column along the same row therewith. The transform register also has a target' column of rows, for storing a target' UID identifying target' data transformed from the target data identified by the target UID stored in the target column along the same row therewith. The transformation of the target data is accomplished by the execution of the transform function identified by the function UID stored in the function column along the same row therewith.

Selecting a row of the transform register which stores a target UID in the target column and a function UID in the function column and a target' UID in the target' column. The three UIDs identify a complete transformation instruction for the target data transformation.

Retrieving the target data to be transformed from the target data base based on the target UID in the identified transformation instruction in the selected row of the transform register.

Retrieving the transform function for transforming the retrieved target data from the transform function roster based on the function UID in the identified transformation instruction in the selected row of the transform register.

Executing the retrieved transform function on the retrieved target data to yield the target' data. The execution transform function may involve a process such as a numerical calculation. That is, the target data may have a numerical value which is transformed by the transform function into a target' data numerical value. The numerical value may be a digital number and the transform function may be a complex mathematical operation involving number crunching or weighting. The transform function may merely be a negative unity multiplication to effect a change in polarity. Alternatively, the execution transform function may involve a condition such as a logical state. That is, the target data may be a logical state which is transformed by the transform function into a target' data logical state. Further, the execution transform function may involve an anchor relationship between the target data and the target' data such as a subset function, a unity function, a union function, an intersection function, or a disjoint function as described above in the section entitled General Anchor Application—FIGS. 3A–3E.

The transformation may be a multiple transformation process involving multiple transformation instructions executing multiple transform functions in series. For instance, the transformation may be a double transformation process involving two serial transformation instructions (a first transformation instruction and a second transformation instruction), executing two transform functions in series (a first transform function and a second transform function) on the target data to provide a target" data. The execution step in this double transform process comprises the following steps.

Execution of the first transformation instruction on the target data identified by the target UID in the target column to provide target' data identified by the target' UID in the target' column. The target' UID is returned within the transform register from the target' column to the target column.

Execution of the second transformation instruction on the target' data identified by the target' UID now in the target column to provide target" data identified by a target" UID in the target' column (see FIG. 1A, rows 4 and 5). The transformation may be a set of parallel transformations involving a set of separate transform functions executed on a set of separate target data to provide a set of separate target' data (see FIG. 1A, rows 7, 8, and 9).

Providing a subject table having a subject column of rows for storing subject UIDs defining subject nodes within the tangle of connecting paths.

Providing an element table having an element column of rows for storing elements which include subject UIDs and target' UIDs and aggregate UIDs and role UIDs. The element table also has an aggregate column of rows, for storing aggregate UIDs, and a role column of rows for storing role UIDs. The subject UIDs stored in the element column are identical to subject UIDs in the subject table. The target' UIDs stored in the element column are identical to target' UIDs in the transform register. The aggregate UIDs stored in the element column are identical to aggregate UIDs in the aggregate column. The role UIDs stored in the element column are identical to role UIDs in the role column.

The method of transforming target data into target' data through a transform function executed on the target data, may have the additional following fold-back steps.

Folding back certain aggregate UIDs from a row in the aggregate column into a different row of the element column. The aggregation of UID elements belonging to each fold-back aggregate UID forms a single element belonging to the aggregation of the aggregate UID stored in the aggregate column along the same row as that fold-back aggregate UID.

Folding back certain aggregate UIDs from a row in the aggregate column of the element table into a different row of the target column of the transform register. The aggregation identified by the fold-back aggregate UID, are transformed by a transform function along the same row of the transform register as the fold-back aggregate UID. The transform function along the same row of the transform register as the fold-back aggregate UID may be a homogenous transform function, which transforms all of the elements of the fold-back aggregation in a homogenous manner. Alternatively, the transform function may be a differential transform function, which transforms at least some of the elements of the fold-back aggregation in a different manner.

Folding back certain role UIDs from a row in the role column into a different row of the element column. The fold-back creates a role connection between the element connection along the same row as a role UID in the row column, and the fold-back role UID in the element column of a different row.

Folding back certain role UIDs from a row in the role column of the element table into a different row of the target column of the transform register. The fold-back role UID is transformed by the transform function along the same row of the transform register as the fold-back role UID, to create a transformed role connection.

INDUSTRIAL APPLICABILITY

It will be apparent to those skilled in the art that the objects of this invention have been achieved as described hereinbefore by providing an extendable UID storage system and method for receiving UIDs and providing UID connections which specify relationships between the UIDs. The UID storage system may be extended indefinitely for receiving additional UIDs specifying additional relationships of increasing complexity between the UIDs. The UID storage system and method specify the relationship between each new UID and the existing UIDs as the system is extended, defining a tangle of connecting paths between the UIDs having fractal relationship structures.

CONCLUSION

Clearly various changes may be made in the construction and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

I claim as my invention:

1. a transformation system for transforming target data into target' data by the execution of transform functions on the target data, comprising:

a transform register which stores UIDs for providing transformation instructions to effect the transformations of target data into target' data;

the transform register having a target column of rows at least some rows of which store target UIDs identifying target data to be transformed;

the transform register having a function column of rows, at least some rows of which store function UIDs identifying transform functions, each transform function for execution on a target datum identified by the target UID stored in the target column along the same row therewith;

the transform register having a target' column of rows, at least some rows of which store target' UIDs, each target' UID identifying a target' datum transformed from a target datum by the execution of the transform function identified by the function UID stored in the function column along the same row therewith on the target datum identified by the target UID stored in the target column along the same row therewith; and each row of the transform register which stores a target UID in the target column thereof and a function UID in the function column thereof and a target' UID in the target' column thereof, provides a transformation instruction for transforming a target datum into a target' datum by the execution of a transform function.

2. The transformation system of claim 1, wherein the columns of the transform register are extendable without constraint by adding rows of target UIDs to the target column and adding rows of function UIDs to the function column and adding row of target' UIDs to the target' column.

3. The transformation system of claim 1, further comprising:

a transform function roster which holds transform functions, and is responsive to the function UIDs stored in the function column of the transform register for providing the transform function identified thereby.

4. The transformation system of claim 3, further comprising:

a function execution unit responsive to the transform functions held in the transform function roster and to the target data identified by the target UIDs, for executing the transform functions on the target data to provide the target' data.

5. The transformation system of claim 1, further comprising:

a subject table having a subject column of rows at least some rows of which store subject UIDs identifying subject data, certain rows of the subject column store subject UIDs which are identical to target UIDs stored in the target column of the transform register, for transforming the subject datum identified by each subject UID into target' datum identified by the target' UID stored in the target' column along the same row therewith by execution of the transform function identified by the function UID stored along the same row therewith; and an element table having an element column of rows at least some rows of which store UID elements, certain rows of the element column store UID elements which are identical to subject UIDs stored in the subject column of the subject table, certain other rows of the element column store UID elements which are identical to target' UIDs stored in the target' column of the transform register.

6. The transformation system of claim 5, wherein the element table further comprises:

an aggregate column of rows, at least some rows of which store aggregate UIDs, each of the aggregate UIDs forms an element connection with an UID element stored in the element column along the same row therewith, identical aggregate UIDs in the aggregate column determine an aggregation of UID elements through the element connections.

7. The transformation system of claim 6, wherein the UID elements stored in the rows of the element column include fold-back aggregate UIDs which are aggregate UIDs folded-back from a row in the aggregate column into a different row of the element column; and the aggregation of UID elements belonging to each fold-back aggregate UID form a single element belonging to the aggregation of the aggregate UID stored in the aggregate column along the same row as that fold-back aggregate UID.

8. The transformation system of claim 6, wherein the target UIDs stored in the rows of the target column of the transform register include fold-back aggregate UIDs which are aggregate UIDs folded-back from a row in the aggregate column of the element table into a different row of the target column, for transformation of the aggregation identified by the aggregate UID, by the transform function along the same row of the transform register as the fold-back aggregation UID.

9. The transformation system of claim 6, wherein the element table further comprises:
   a role column of rows, at least some rows of which store role UIDs, for providing a role connection between each role UID in the role column and the element connection between the UID element and the aggregate UID along the same row as the role UID.

10. The transformation system of claim 9,
    wherein the UID elements stored in the rows of the element column include fold-back role UIDs which are role UIDs folded-back from a row in the role column into a different row of the element column; and
    wherein the role connection provided by each role UID in the role column and the identical fold-back role UID in the element column is between the aggregate UID in the same row as the fold-back role UID and the element connection along the same row as the role UID.

11. The transformation system of claim 9, wherein the target UIDs stored in the rows of the target column of the transform register include fold-back role UIDs which are role UIDs folded-back from a row in the role column into a different row of the target column, for transformation of the role connection identified by the fold-back role UID by a transform function along the same row of the transform register as the fold-back role UID.

12. A method of transforming target data into target' data through transform functions executed on the target data, comprising the steps of:
   providing a transform register having
      a target column of rows storing target UIDs identifying target data to be transformed contained in a target data base,
      a function column of rows, storing function UIDs identifying transform functions held in a transform function roster, each transform function to be applied to a target datum identified by the target UID stored in the target column along the same row therewith, and
      a target' column of rows, storing target' UIDs identifying target' data, each target' datum transformed from the target datum identified by the target UID stored in the target column along the same row therewith by the execution of the transform function identified by the function UID stored in the function column along the same row therewith;
   selecting a row of the transform register which stores a target UID in the target column and a function UID in the function column and a target' UID in the target' column identifying a complete transformation instruction for the target data transformation;
   retrieving the target data to be transformed from the target data base based on the target UID in the identified transformation instruction in the selected row of the transform register;
   retrieving the transform function for transforming the retrieved target data from the transform function roster based on the function UID in the identified transformation instruction in the selected row of the transform register; and
   executing the retrieved transform function on the retrieved target data to yield the target' data.

13. The method of transforming of claim 12, wherein the target data is a numerical value, and the transform function transforms the numerical value of the target data into a target' data numerical value.

14. The method of transforming of claim 12, wherein the target data is a logical state, and the transform function transforms the logical state of the target data into a target' data logical state.

15. The method of transforming of claim 12, wherein the transform function is an anchor transform function for defining an anchor relationship between the target data and the target' data.

16. The method of transforming of claim 15, wherein the anchor transform function is a subset function defining the target' data as a subset of the target data.

17. The method of transforming of claim 15, wherein the anchor transform function is a unity function defining the target' data as the whole of the target data.

18. The method of transforming of claim 15, wherein the anchor transform function is a union function defining the target data as a subset of the target' data.

19. The method of transforming of claim 15, wherein the anchor transform function is an intersection function defining the target' data as intersecting the target data and including a common portion of the target data.

20. The method of transforming of claim 15, wherein the anchor transform function is a disjoint function defining the target' data as disjointed from the target data and not including any portion of the target data.

21. The method of transforming of claim 12, wherein the transformation is a double transformation process involving a first transformation instruction and a second transformation instruction executing a first transform function and a second transform function in series on the target data to provide a target" data, wherein the executing step comprises the steps;
   execution of the first transformation instruction on the target data identified by the target UID in the target column to provide target' data identified by the target' UID in the target' column, which target' UID is returned within the transform register from the target' column to the target column; and
   execution of the second transformation instruction on the target' data identified by the target' UID now in the target column to provide target" data identified by a target" UID in the target' column.

22. The method of transforming of claim 21, wherein the transformation is a multiple transformation process involving multiple transformation instructions executing multiple transform functions in series.

23. The method of transforming of claim 12, wherein the transformation is a set of parallel transformations involving a set of separate transform functions executed on a set of separate target data to provide a set of separate target' data.

24. The method of transforming of claim 12, comprising the additional step of:
   providing an element table having
      an element column of rows for storing elements which include target' UIDs identical to target' UIDs in the transform register;

an aggregate column of rows, at least some rows of which store aggregate UIDs, each of the aggregate UIDs form an element connection with a target' UID stored in the element column along the same row therewith, identical aggregate UIDs in the aggregate column determine an aggregation of UID elements through the element connections; and a role column of rows, at least some rows of which store role UIDs, for providing a role connection between each role UID in the role column and the element connection between the target' UID and the aggregate UID along the same row as the role UID.

25. The method of transforming of claim 24, comprising the additional step:

folding back certain aggregate UIDs from a row in the aggregate column into a different row of the element column, the aggregation of UID elements belonging to each fold-back aggregate UID forms a single element belonging to the aggregation of the aggregate UID stored in the aggregate column along the same row as that fold-back aggregate UID.

26. The method of transforming of claim 24, comprising the additional step:

folding back certain aggregate UIDs from a row in the aggregate column of the element table into a different row of the target column of the transform register, for transformation of the aggregation identified by the fold-back aggregate UID, by a transform function along the same row of the transform register as the fold-back aggregate e UID.

27. The method of transforming of claim 26, wherein the transform function along the same row of the transform register as the fold-back aggregate UID is a homogenous transform function, which homogeneous transform function transforms all of the elements of the fold-back aggregate UID in a homogenous manner.

28. The method of transforming of claim 26, wherein the transform function along the same row of the transform register as the fold-back aggregate UID is a differential transform function, which differential transform function transforms at least some of the elements of the fold-back aggregate UID in a different manner.

29. The method of claim 24, further comprising the additional step of:

folding back certain role UIDs from a row in the role column into a different row of the element column, to create a role connection between the element connection along the same row as a role UID in the row column, and the fold-back role UID in the element column of a different row.

30. The method of claim 24, further comprising the additional step of:

folding back certain role UIDs from a row in the role column of the element table into a different row of the target column of the transform register, which is transformed by the transform function along the same row of the transform register as the fold-back role UID, to create a transformed role connection.

* * * * *

UNITED STATES PATENT AND TRADEMARK OFFICE
CERTIFICATE OF CORRECTION

PATENT NO.   : 6,144,966

DATED        : November 7, 2000

INVENTOR     : Michael G. Roberts

It is certified that error appears in the above-identified patent and that said Letters Patent is hereby corrected as shown below:

In column 17, line 30 replace, "fold-back aggregate e UID." with --fold-back aggregate UID.--

Signed and Sealed this

First Day of May, 2001

*Attest:*

NICHOLAS P. GODICI

*Attesting Officer*    *Acting Director of the United States Patent and Trademark Office*